US010552407B2

(12) United States Patent
Chen et al.

(10) Patent No.: US 10,552,407 B2
(45) Date of Patent: Feb. 4, 2020

(54) COMPUTING DEVICE FOR DATA MANAGING AND DECISION MAKING

(71) Applicant: Chikuan Chen

(72) Inventors: Chikuan Chen, Taichung (TW); Hanming Wu, Taipei (TW)

(73) Assignee: MACKAY MEMORIAL HOSPITAL, Taipei (TW)

( * ) Notice: Subject to any disclaimer, the term of this patent is extended or adjusted under 35 U.S.C. 154(b) by 498 days.

(21) Appl. No.: 15/116,827

(22) PCT Filed: Jul. 23, 2014

(86) PCT No.: PCT/IB2014/063335
§ 371 (c)(1),
(2) Date: Aug. 5, 2016

(87) PCT Pub. No.: WO2015/118387
PCT Pub. Date: Aug. 13, 2015

(65) Prior Publication Data
US 2016/0350361 A1 Dec. 1, 2016

(30) Foreign Application Priority Data

Feb. 7, 2014 (TW) .............................. 103104057 A
Jun. 17, 2014 (TW) .............................. 103120860 A

(51) Int. Cl.
*G06F 16/9535* (2019.01)
*G06F 16/23* (2019.01)
(Continued)

(52) U.S. Cl.
CPC ............ *G06F 16/2365* (2019.01); *G06F 7/02* (2013.01); *G06F 16/215* (2019.01);
(Continued)

(58) Field of Classification Search
CPC ......... G06F 17/30867; G06F 17/30528; G06F 17/3053; G06F 16/24578; G06F 16/9535; G06F 16/9038
See application file for complete search history.

(56) References Cited

U.S. PATENT DOCUMENTS 7,092,932 B1    8/2006  Titus
8,166,026 B1 *  4/2012  Sadler ............... G06F 17/30864
                                                    707/725
(Continued)

FOREIGN PATENT DOCUMENTS

CN    101556603 A    10/2009
CN    101788986 A     7/2010
CN    102929874 A     2/2013

OTHER PUBLICATIONS

C. Ragin, "Set Relations in Social Research: Evaluating Their Consistency and Coverage", 2006, Oxford University Press on behalf of the Society for Political Methodology. (Year: 2006).*
(Continued)

*Primary Examiner* — Apu M Mofiz
*Assistant Examiner* — Sheryl L Holland
(74) *Attorney, Agent, or Firm* — Idea Intellectual Limited; Margaret A. Burke; Sam T. Yip

(57) ABSTRACT

The present invention provides a computing device including a system ranking unit, a subset ranking unit, an evaluation module of computing units and a decision module. The system ranking unit is configured to rank at least one or more elements to acquire a first ranking based on features of at least one set of data. The subset ranking unit is configured to select a subset from the elements, and is configured to re-rank elements in the subset to acquire a second ranking. The computing units are configured to calculate a relevance of consistency between the first ranking and the second ranking, and are configured to calculate a second rating
(Continued)

associated with a first identification message. The decision module is configured to determine a data access level of the first identification message, and configured to access the data based on the data access level.

10 Claims, 4 Drawing Sheets

(51) Int. Cl.
    *G06F 16/215*     (2019.01)
    *G06F 16/2457*     (2019.01)
    *G06F 7/02*     (2006.01)
    *G06F 16/9038*     (2019.01)

(52) U.S. Cl.
    CPC .... *G06F 16/24578* (2019.01); *G06F 16/9038* (2019.01); *G06F 16/9535* (2019.01)

(56) References Cited

U.S. PATENT DOCUMENTS

| | | | |
|---|---|---|---|
| 9,436,820 B1* | 9/2016 | Gleichauf | G06F 21/50 |
| 2007/0174279 A1* | 7/2007 | Jatowt | G06F 17/30864 |
| 2008/0201323 A1* | 8/2008 | Tuttle | G06F 17/30696 |
| 2009/0024605 A1* | 1/2009 | Yang | G06F 17/30867 |
| 2012/0095993 A1* | 4/2012 | Shau | G06F 17/30675 |
| | | | 707/723 |
| 2012/0137367 A1* | 5/2012 | Dupont | G06F 21/00 |
| | | | 726/25 |
| 2013/0159506 A1* | 6/2013 | Stern | G06F 17/30 |
| | | | 709/224 |
| 2013/0159507 A1* | 6/2013 | Mason | G06Q 30/02 |
| | | | 709/224 |
| 2013/0282698 A1* | 10/2013 | Oztekin | G06F 17/30554 |
| | | | 707/722 |
| 2013/0297612 A1* | 11/2013 | Ravid | G06F 17/30648 |
| | | | 707/740 |
| 2014/0019469 A1* | 1/2014 | Chen | G16H 10/60 |
| | | | 707/758 |
| 2014/0072939 A1* | 3/2014 | Dahan | G06Q 50/24 |
| | | | 434/262 |
| 2015/0149455 A1* | 5/2015 | Whitley, Jr. | G06F 17/30483 |
| | | | 707/734 |

OTHER PUBLICATIONS

Bickman et al., "Effects of Routine Feedback to Clinicians on Mental Health Outcomes of Youths: Results of a Randomized Trial", 2011, Psychiatric Services, vol. 62, No. 12, ps.psychiatryonline.org. (Year: 2011).*

* cited by examiner

COMPUTING DEVICE FOR DATA MANAGING AND DECISION MAKING

BACKGROUND OF THE INVENTION

1. Field of the Invention

The present invention relates to a computing device, more particularly, relates to a computing device for data managing and decision making.

2. The Prior Art

During the process of data exchanging, a reasonable mechanism is needed so that data providers and data users are willing to exchange data via such a mechanism. To be more specific, there is a need for an evaluation and feedback mechanism through which data providers and data users may receive reasonable evaluations and feedbacks; with such a mechanism, data providers and data users are encouraged to and also more willing to perform subsequent data transactions.

SUMMARY OF THE INVENTION

The primary objective of the present invention is to provide a computing device for data managing and decision making. The purpose of such a computing device is to perform data exchanging and communication with a data source, so evaluation scores of the data may be calculated and decision management may be implemented.

In order to achieve the foregoing objectives, the present invention provides a computing device for data managing and decision making, at least including: a system ranking unit, a subset ranking unit, an evaluation module of computing units and a decision module. Among the above units, the computing units further includes a weight computing unit, compliance computing unit, a feedback computing unit and a final score computing unit.

Regarding the evaluation module, the system ranking unit is configured to rank at least one or more elements to acquire a first ranking based on features of at least one set of data stored in the data source, wherein the at least one or more elements are in correspondence to the at least one set of data. The subset ranking unit is configured to select a subset from the at least one or more elements having the first ranking based on the features of the at least one set of data, and is configured to re-rank elements in the subset to acquire a second ranking. The computing units are configured to calculate a relevance of consistency between the first ranking and the second ranking, configured to calculate a second rating associated with a first identification message based on the relevance of consistency and a first rating associated with the at least one set of data, and also configured to store the second rating in the data source. The decision module is configured to retrieve the second rating from the data source, configured to determine a data access level of the first identification message based on the second rating, and configured to access the at least one set of data based on the data access level of the first identification message.

BRIEF DESCRIPTION OF THE DRAWINGS

The present invention is best understood from the following detailed description when read in connection with the accompanying drawings. According to common practice, the various elements and features in the drawings are not drawn to scale. On the contrary, each elements and features are arbitrarily expanded or reduced for clarity. Included in the drawings are the following figures.

DETAILED DESCRIPTION OF THE PREFERRED EMBODIMENT

Figure 1:
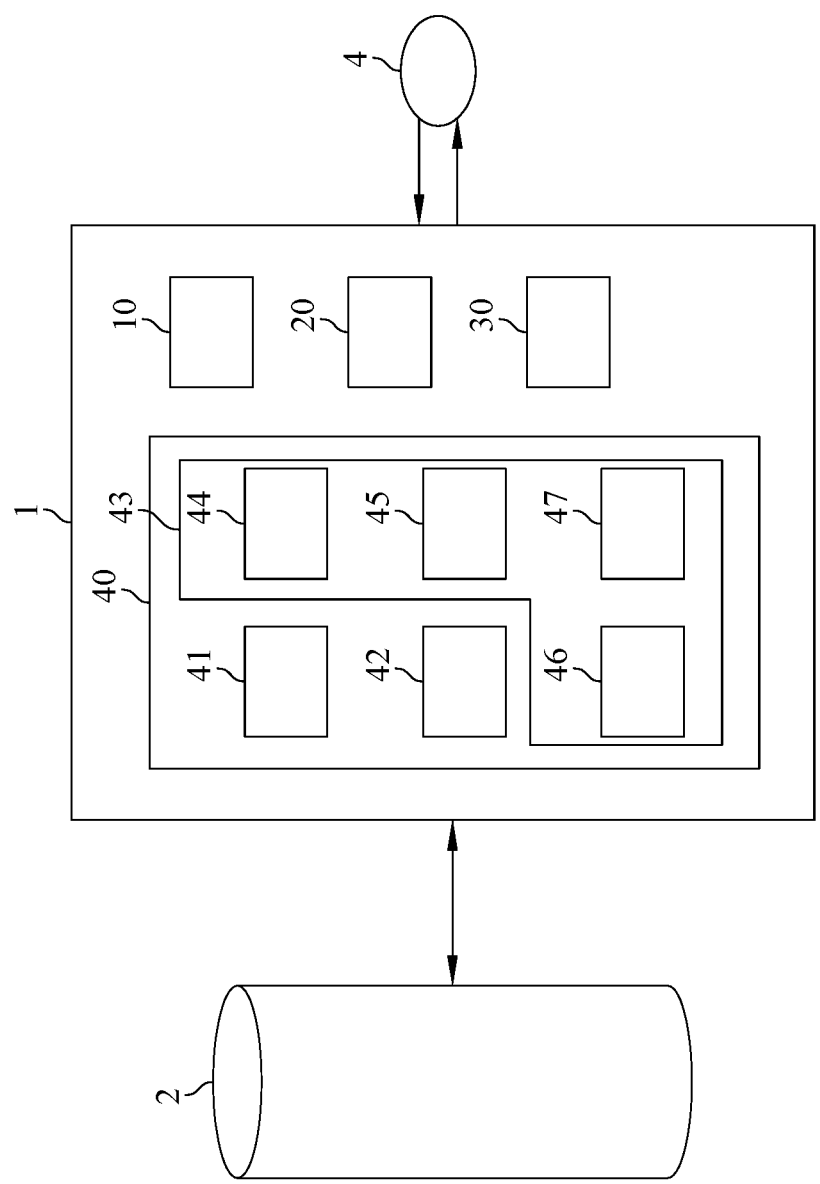
FIG. 1 is a schematic view illustrating a computing device for data managing and decision making according to an embodiment of the present invention.

FIG. 1 is a schematic view showing a computing device for data managing and decision making according to an embodiment of the present invention. As shown in FIG. 1, a computing device 1 is configured to exchange data and communicate with a data source so as to calculate a total score of the data and to implement decision management. Herein, the data source is a database 2 and/or a specimen bank (not shown) and/or a random access memory (RAM) (not shown). The data stored in the database 2 and/or specimen bank may be from a hospital information system (not shown) and/or a lab information system (not shown) and/or a specimen module. The RAM may be used to temporarily store the data/data, and/or temporarily store the data from the database 2 and/or the specimen bank, or store the data to be entered into the database 2 and/or the specimen bank.

In the present embodiment, the computing device 1 at least includes an evaluation module 40 and a decision module 20. In addition, according to the actual status of implementation, the computing device 1 may further includes a validity module 10 and a search module 30. It should be noted that the validity module 10 and the search module 30 are not essential for composing the computing device 1.

The computing device 1 is composed of the evaluation module 40, which includes a system ranking unit 41, a subset ranking unit 42 and computing units 43, and the decision module 20.

Figure 2:
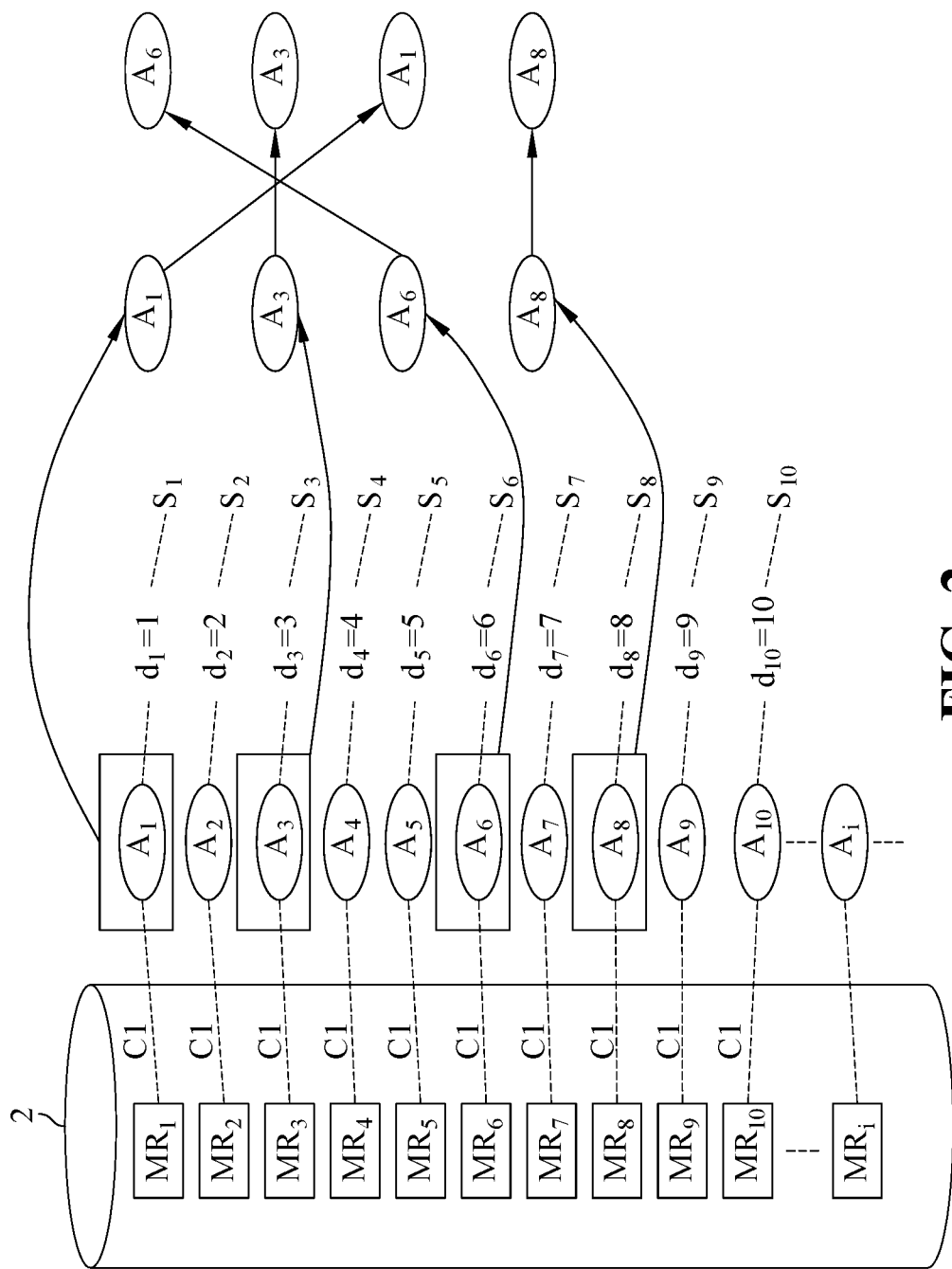
FIG. 2 is a schematic view illustrating the ranking computation performed on the medical record providers by a system ranking unit and a subset ranking unit, respectively, according to an embodiment of the present invention.
Figure 3:
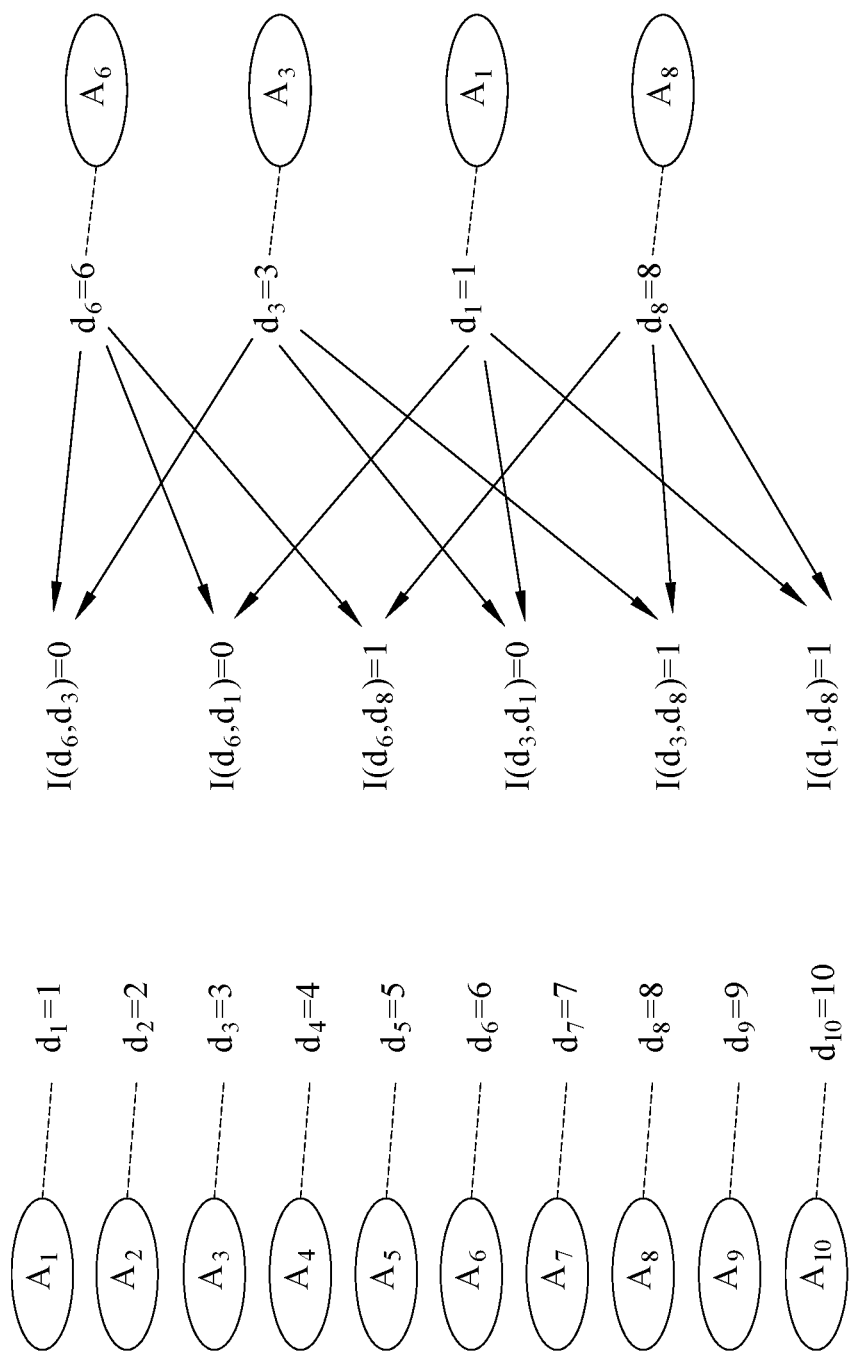
FIG. 3 is a schematic view illustrating the indicator function values according to an embodiment of the present invention.

The system ranking unit 41 is configured to rank at least one or more elements to acquire a first ranking based on features of at least one set of data stored in the data source (e.g. the database 2). The at least one or more elements are in correspondence to the at least one set of data. Herein, as shown in FIGS. 2 and 3, the at least one set of data is a medical record $\{MR_i\}$. The evaluation module 40 (e.g. the system ranking unit 41) rates the at least one set of data (e.g. the medical record $\{MR_i\}$) based on a number of times of which the at least one set of data is accessed by a user (not limited to the user 4, it could also be referring to other users), or rates each of the medical record $\{MR_i\}$ (each set of data) based on a degree of detail of which the at least one set of data (e.g. the medical record $\{MR_i\}$) is recorded regarding the symptoms of patients. In addition, based on the ratings of each medical records $\{MR_i\}$ (each set of data), and/or, based on a weight value and/or an interchange weight value calculated by a weight computing unit 44, the evaluation module 40 (e.g. the system ranking unit 41) ranks each providers $\{A_i\}$ (each elements) of each of the medical record $\{MR_i\}$ (each set of data) to acquire a first ranking. That is, the system ranking unit 41 is configured to rank at least one or more elements (e.g. at least one provider $\{A_i\}$ of the medical record $\{MR_i\}$) to acquire a first ranking based on features of at least one set of data (e.g. the medical record $\{MR_i\}$) stored in the data source (e.g. database 2). The at least one or more elements (e.g. at least one provider $\{A_i\}$ of the medical record $\{MR_i\}$) are in correspondence to the at least one set of data (e.g. the medical record $\{MR_i\}$).

The subset ranking unit 42 is configured to select a subset from the at least one or more elements having the first ranking based on the features of the at least one set of data (e.g. the medical record $\{MR_i\}$), and is configured to re-rank elements in the subset to acquire a second ranking. Herein, as shown in FIGS. 2 and 3, the subset ranking unit 42 is configured to select a subset from the at least one or more elements (the providers $\{A_i\}$ of the medical records $\{MR_i\}$) having the first ranking based on the features of the at least one set of data (e.g. the medical record $\{MR_i\}$), and is configured to re-rank elements in the subset (at least one or more providers $\{A_i\}$ of the medical records $\{MR_i\}$) to acquire the second ranking. In other words, the subset ranking unit 42 is configured to select a subset from all of the providers $\{A_i\}$ of the medical records $\{MR_i\}$ having the first ranking based on the features of the at least one medical record $\{MR_i\}$, and is configured to re-rank at least one or more providers $\{A_i\}$ of the medical records $\{MR_i\}$ in the subset to acquire the second ranking.

The computing units 43 are configured to calculate a relevance of consistency between the first ranking and the second ranking, are configured to calculate a second rating associated with a first identification message based on the relevance of consistency and a first rating associated with the at least one set of data, and are configured to store the second rating in the data source. In other words, the computing units 43 are configured to calculate the relevance of consistency (also referred to as the "compliance C") between the first ranking acquired from all providers $\{A_i\}$ of the medical records $\{MR_i\}$ and the second ranking acquired from part of the providers. The computing units 43 then calculate the second rating associated with the first identification message based on the relevance of consistency and the first rating, and are configured to store the second rating in the data source. Herein, for example, the relevance of consistency (also referred to as the "compliance C") between all of the providers of the medical records $\{MR_i\}$ (the first ranking) and the subset ranking (the second ranking) is calculated by a compliance computing unit 45. The first rating may be a rating associated with user identification (e.g. the compliance "C"), or may be a total feedback value $R_s$, or may be an average feedback value $R_m$, or may be a feedback value generated by a feedback computing unit 46 corresponding to the ones in publication works. On the other hand, for example, a rating (e.g. referred to as "B(m)") associated with the user identification UID (the first identification message) may be calculated based on the compliance "C" and the feedback values (e.g. a sum $R_s$ or an average value $R_m$ of the adjusted research performance index (RPI) values). A final score computing unit 47 is configured to calculate a final score (referred to as "T(m)") (the second rating) associated with the user identification UID (the first identification message) based on the rating (i.e. "B(m)") associated with the user identification UID (the first identification message), and is configured to store the final score in the data source.

The decision module 20 is configured to retrieve the second rating from the data source, and is configured to determine a data access level of the first identification message. The at least one set of data is accessed based on the data access level of the first identification message. In other words, the decision module 20 retrieves the final score ("T(m)") (the second rating) from the data source, and determines the data access level of the user identification UID (the first identification message) based on the final score ("T(m)"). The access of the at least one set of data (the medical record $\{MR_i\}$) is determined based on the data access level of the user identification UID (the first identification message).

The user 4 logs into the computing device 1 with the user identification UID (including account name and passwords). Subsequently, the validity module 10 validates the user identification UID. If the user identification is approved, as shown in FIG. 2, the user 4 is authorized to access the data stored in the database 2 (e.g. the medical records $\{MR_i\}$) via the computing device 1.

That is, the user 4 may send out a request REQ for the desired medical records (for example, including the keywords of the desired medical records). As shown in FIG. 2, in response to the request REQ, the search module 30 searches the database 2 for medical records with the requested keywords. For example, the search may return with four medical records $MR_6$, $MR_3$, $MR_1$ and $MR_8$. Then, the user 4 may utilize the computing device 1 to perform subsequent data accessing and computation on the medical records $MR_6$, $MR_3$, $MR_1$ and $MR_8$ acquired from the search.

On the other hand, each records of the medical records $\{MR_i\}$ stored in the database 2 has a predetermined rating. In the present embodiment, the rating may be a rating "C1" disclosed by U.S. patent application Ser. No. 13/939,764. The rating "C1" is determined based on a number of time of which the medical records $\{MR_i\}$ are accessed by the user, or is determined based on the degree of details of which the medical records $\{MR_i\}$ is recorded regarding the symptoms of the patient. For example, if the medical record $MR_1$ is accessed more frequently than the medical record $MR_2$, then the rating "C1" of the medical record $MR_1$ is higher than the rating "C1" of the medical record $MR_2$. Alternatively, if the medical record $MR_1$ records the symptoms of the patient in a more detailed manner than the medical record $MR_2$, then the rating "C1" of the medical record $MR_1$ is higher than the rating "C1" of the medical record $MR_2$. Furthermore, the evaluation module 40 ranks the providers $\{A_i\}$ of the medical records $\{MR_i\}$ based on the ratings "C1" of the medical records $\{MR_i\}$.

In the embodiment shown in FIG. 1, the evaluation module 40 may include the system ranking unit 41, the subset ranking unit 42 and the computing units 43. The computing units 43 includes the weight computing unit 44, the compliance computing unit 45, the feedback computing unit 46 and the final score computing unit 47. The system ranking unit 41 is configured to carry out ranking computations on the providers $\{A_i\}$ of the medical records $\{MR_i\}$ based on the ratings "C1" of the medical records $\{MR_i\}$. The higher the rating "C1" of a medical record, the higher the ranking of the provider $\{A_i\}$ of the medical record $\{MR_i\}$ is.

FIG. 2 is a schematic view illustrating the ranking computation performed on the medical record providers by a system ranking unit and a subset ranking unit, respectively, according to an embodiment of the present invention. FIG. 2 illustrates the ranking computation performed on the medical record providers $\{A_i\}$ by the system ranking unit and the subset ranking unit 42, respectively, according to an embodiment of the present invention. As shown in FIG. 2, the system ranking unit 41 selects the top "M" providers $A_1$, $A_2$, $A_3$, ..., $A_{M-1}$, $A_M$ among all the providers $\{A_i\}$ of the medical records $\{MR_i\}$ stored in the database 2; herein, "M" is a positive integer. In the present embodiment, the system ranking unit 41 selects the top ten medical record providers (M=10), which are referred to as $A_1, A_2, A_3, A_4, A_5, A_6, A_7, A_8, A_9$ and $A_{10}$. The ranking of these medical record providers are defined as: $\{d_i\}|_{i=1,2,\ldots,10} = \{d_1, d_2, d_3, \ldots, d_9, d_{10}\} = \{1, 2, 3, 4, 5, 6, 7, 8, 9, 10\}$.

In addition, based on the ranking $\{d_i\}|_{i=1,2,\ldots,10} = \{d_1, d_2, d_3, \ldots, d_9, d_{10}\}$, the weight computing unit 44 of the computing units calculates a set of weight values $S_1, S_2, S_3, S_4, S_5, S_6, S_7, S_8, S_9$ and $S_{10}$. The set of weight values is in correspondence to the medical record providers $A_1, A_2, A_3, A_4, A_5, A_6, A_7, A_8, A_9$ and $A_{10}$. In the present embodiment, the higher the ranking of the medical record provider $\{A_i\}$, the higher the weight value $S_i$ is. For example, the medical record provider $A_1$ is ranked as the first ($d_1$=1), so the medical record provider $A_1$ has the highest weight value $S_1$. On the contrary, the medical record provider $A_{10}$ is ranked as the tenth ($d_{10}$=10), so the medical record provider $A_{10}$ has the lowest weight value $S_{10}$.

Further, in the present embodiment, the weight values $\{S_k\}|_{k=\{1,2,3,4,5,6,7,8,9,10\}}$ of the selected medical record providers $A_1, A_2, A_3, A_4, A_5, A_6, A_7, A_8, A_9$ and $A_{10}$ is defined as an arithmetic sequence. The weight values are adjusted so that the sum of the weight values $\{S_k\}|_{k=\{1,2,3,4,5,6,7,8,9,10\}}$ is equal to one. The weight values $\{S_k\}|_{k=\{1,2,3,4,5,6,7,8,9,10\}}$ may be represented by the following formula:

$$S_k|_{k=1,2,3,4,\ldots,10} = \frac{M-k+1}{M\times(M+1)/2}\bigg|_{M=10} \quad \text{formula (1)}$$

Based on formula (1), it can be known that the corresponding weight values of the selected medical record providers $A_1, A_2, A_3, A_4, A_5, A_6, A_7, A_8, A_9$ and $A_{10}$ are:

$$S_1 = \frac{10}{55}, S_2 = \frac{9}{55}, S_3 = \frac{8}{55}, S_4 = \frac{7}{55}, S_5 = \frac{6}{55}, S_6 = \frac{5}{55},$$

$$S_7 = \frac{4}{55}, S_8 = \frac{3}{55}, S_9 = \frac{2}{55}, S_{10} = \frac{1}{55},$$

respectively.

In addition, according to the weight values $\{S_k\}|_{k=\{1,2,3,4,5,6,7,8,9,10\}}$ of the medical record providers $A_1, A_2, A_3, A_4, A_5, A_6, A_7, A_8, A_9$ and $A_{10}$, a set of interchange weight values $\{W_{i,j}\}|_{i,j=\{1,2,3,4,5,6,7,8,9,10\}, i\neq j}$ may be calculated by the weight computing unit 44. Herein, the interchange weight value $\{W_{i,j}\}$ is defined as the product of the weight values of the corresponding two medical record providers among the medical record providers $A_i$, and $A_j$, which can be represented by the following formula (2):

$$\{W_{i,j}\} = S_i \times S_j \quad \text{formula (2)}$$

In the present embodiment:

$$\{W_{1,2}\} = S_1 \times S_2 = \frac{10}{55} \times \frac{9}{55} = 0.03$$

$$\{W_{1,3}\} = S_1 \times S_3 = \frac{10}{55} \times \frac{8}{55} = 0.026$$

...

$$\{W_{1,10}\} = S_1 \times S_{10} = \frac{10}{55} \times \frac{1}{55} = 0.003$$

and so on.

On the other hand, from the perspective of the user 4, a number of "n" providers are selected from the medical record providers $A_1, A_2, A_3, A_4, A_5, A_6, A_7, A_8, A_9$ and $A_{10}$, and the selected providers are ranked by the subset ranking unit 42. In the present embodiment, from the perspective of the user 4, among the medical records $MR_1, MR_2, MR_3, MR_4, MR_5, MR_6, MR_7, MR_8, MR_9$ and $MR_{10}$, $MR_1, MR_3, MR_6$ and $MR_8$ are assumed to be helpful to the research of the user 4. Further, among the selected medical records, the medical record $MR_6$ is assumed to be most helpful for or has the highest contribution to the research of the user 4, following by the medical record $MR_3, MR_1$ and $MR_8$. Thus, as shown in FIG. 2, the user 4 selects four people (n=4) from the medical record providers $A_1, A_2, A_3, A_4, A_5, A_6, A_7, A_8, A_9$ and $A_{10}$, which are the providers $A_1, A_3, A_6$ and $A_8$ of the medical records $MR_1, MR_3, MR_1$ and $MR_8$, and then the providers are ranked by the subset ranking unit 42 as $\{A_6, A_3, A_1, A_8\}$.

Moreover, the relevance of consistency (referred to as the "compliance C") between the system ranking $\{d_i\}|_{i=1,2,\ldots,10}$ of the medical record providers $A_1, A_2, A_3, A_4, A_5, A_6, A_7, A_8, A_9$ and $A_{10}$ and the subset ranking $\{A_6, A_3, A_1, A_8\}$ may be calculated by the compliance computing unit 45 of the computing units 43. In the present embodiment, the compliance "C" may be determined by the formula (3) below:

$$C = 100 \times \frac{\sum_{i,j}^{n} W_{i,j} I(d_i, d_j)}{(n(n-1)/2)\sum_{i,j}^{n} W_{i,j}} \quad \text{formula (3)}$$

In formula (3), $I(d_i, d_j)$ is the indicator function, which is defined as the following:

$I(d_i, d_j) = 1$ if $d_i < d_j$ $I(d_i, d_j) = 0$ if $d_i > d_j$

FIG. 3 is a schematic view illustrating the indicator function value according to an embodiment of the present invention. FIG. 3 illustrates the indicator function value in an embodiment of the present invention. The purpose of the indicator function value is to determine whether the ranking results of any two medical providers $A_i$ and $A_j$ from the two ranking units are consistent. That is, as shown in FIG. 3, if the ranking $\{A_6, A_3, A_1, A_8\}$ of the four selected medical record providers $A_1, A_3, A_6$ and $A_8$ provided by the subset ranking unit is consistent with the ranking $\{d_i\}|_{i=1,2,\ldots,10} = \{d_1, d_2, d_3, \ldots, d_9, d_{10}\} = \{1, 2, 3, 4, 5, 6, 7, 8, 9, 10\}$ of the medical record providers $A_1, A_2, A_3, A_4, A_5, A_6, A_7, A_8, A_9$ and $A_{10}$ provided by the system ranking unit 41, then the indicator function $I(d_1, d_8) = 1$. As an example of the consistency: the ranking of the medical record providers $A_1$ and $A_8$ provided by the subset ranking unit 42 is $\{A_1, A_8\}$, which is consistent with the sequence of the ranking provided by the system ranking unit 41 (($d_1$=1)<($d_8$=8)).

On the contrary, the ranking of the medical record providers $A_6$ and $A_3$ provided by the subset ranking unit 42 is $\{A_6, A_3\}$, which is inconsistent with the ranking provided by the system ranking unit 41 (($d_6$=6)>($d_3$=3)). Hence, the indicator function $I(d_6, d_3) = 0$.

It can be known from the above description that the indicator function $I(d_j, d_i)$ is capable of showing the relevance of consistency between the ranking $\{d_i\}|_{i=\{1,2,\ldots,10\}}$ of the medical record providers $A_1$, $A_2$, $A_3$, $A_4$, $A_5$, $A_6$, $A_7$, $A_8$, $A_9$ and $A_{10}$ determined by the system ranking unit 41 and the ranking $\{A_6, A_3, A_1, A_8\}$ determined by the subset ranking unit 42.

In the present embodiment, the indicator function values of any of the two medical record providers $\{A_6, A_3\}$, $\{A_6, A_1\}$, $\{A_6, A_8\}$, $\{A_3, A_1\}$, $\{A_3, A_8\}$ and $\{A_1, A_8\}$ are calculated by the compliance computing unit 45, The results are shown as the following:

$$I(d_6, d_3) = I(6,3) = 0$$

$$I(d_6, d_1) = I(6,1) = 0$$

$$I(d_6, d_8) = I(6,8) = 1$$

$$I(d_3, d_1) = I(3,1) = 0$$

$$I(d_3, d_8) = I(3,8) = 1$$

$$I(d_1, d_8) = I(1,8) = 1$$

Since the indicator function values of different medical record providers have different weight values, the weighted indicator function values may be obtained by multiplying the indicator function values $I(d_i, d_j)$ of any of the two medical record providers among $\{A_6, A_3, A_1, A_8\}$ with its corresponding interchange weight value $\{W_{i,j}\}$. In the present embodiment, the weighted indicator function value $W_{i,j} \times I(d_i, d_j)$ of any of the two medical record providers among $\{A_6, A_3, A_1, A_8\}$ are:

$$W_{6,3} \times I(d_6, d_3) = S_6 \times S_3 \times I(6,3) = \frac{5}{55} \times \frac{8}{55} \times 0 = 0.013 \times 0 = 0$$

$$W_{6,1} \times I(d_6, d_1) = S_6 \times S_1 \times I(6,1) = \frac{5}{55} \times \frac{10}{55} \times 0 = 0.016 \times 0 = 0$$

$$W_{6,8} \times I(d_6, d_8) = S_6 \times S_8 \times I(6,8) = \frac{5}{55} \times \frac{3}{55} \times 1 = 0.005$$

$$W_{3,1} \times I(d_3, d_1) = S_3 \times S_1 \times I(3,1) = \frac{8}{55} \times \frac{10}{55} \times 0 = 0.026 \times 0 = 0$$

$$W_{3,8} \times I(d_3, d_8) = S_3 \times S_8 \times I(3,8) = \frac{8}{55} \times \frac{3}{55} \times 0 = 0.008$$

$$W_{1,8} \times I(d_1, d_8) = S_1 \times S_8 \times I(3,8) = \frac{10}{55} \times \frac{3}{55} \times 1 = 0.01$$

Subsequently, the weighted indicator function values are summed up as indicated by formula (4) below:

$$\Sigma_{i,j \in \{1,3,6,8\}} W_{i,j} \times I(d_i, d_j) = 0.005 + 0.008 + 0.01 = 0.023 \quad \text{formula (4)}$$

Then, the sum of the weighted indicator function value is normalized so the value falls between 0 and 1, which is indicated by formula (5) below:

$$\left. \frac{\sum_{i,j \in \{1,3,6,8\}} W_{i,j} \times I(d_i, d_j)}{(n(n-1)/2) \sum_{i,j \in \{1,3,6,8\}} W_{i,j}} \right|_{n=4} = \quad \text{formula (5)}$$

$$\frac{0.023}{6 \times (0.013 + 0.016 + 0.005 + 0.026 + 0.008 + 0.01)} = 0.049$$

The adjusted sum of the weighted indicator function value is then scaled-up so the value falls between 0 and 100, thereby obtaining the compliance "C" from formula (3). In the present embodiment, $C = 0.049 \times 100 = 4.9$.

On the other hand, all of the medical records $\{MR_i\}$ stored in the database 2 are provided by a number of "N" providers $\{A_i\}|_{i=\{1,2,\ldots,N\}}$. Among all the medical records, the medical records $\{MR_6, MR_3, MR_1, MR_8\}$ are helpful to the research of the user 4, such as a special research project of the Ministry of Science. Hence, in the present embodiment, the user 4 may list the medical record providers $\{A_6, A_3, A_1, A_8\}$ as the contributors of the project of the Ministry of Science, thereby providing feedback to the medical record providers $\{A_6, A_3, A_1, A_8\}$. In other words, the research performance index (RPI) values of the medical record providers $\{A_6, A_3, A_1, A_8\}$ at the Ministry of Science will be increased. In the present embodiment, assuming the medical record providers $\{A_6, A_3, A_1, A_8\}$ can be acquired from a scholar database of the Ministry of Science, the RPI values thereof is $\{r_6, r_3, r_1, r_8\} = \{4, 1, 2, 3\}$. In the present invention, the RPI values $\{r_6, r_3, r_1, r_8\} = \{4, 1, 2, 3\}$ can be seen as the feedback values being provided to each of the medical record providers $\{A_6, A_3, A_1, A_8\}$ by the user 4.

The feedback value computing unit 46 of the computing units 43 is configured to adjust the RPI values $\{r_6, r_3, r_1, r_8\}$, so that the adjusted RPI values $\{r_6', r_3', r_1', r_8'\}$ is a number between 0 and 100. The adjusted RPI values can be represented by formula (6) below:

$$r_i' = 100 \times \frac{r_i - \min\limits_{1 \leq j \leq N}(r_j)}{\max\limits_{1 \leq j \leq N}(r_j) - \min\limits_{1 \leq j \leq N}(r_j)} \quad i = 6, 3, 1, 8 \quad \text{formula (6)}$$

In formula (6), $$\max_{1 \leq j \leq N}(r_j)$$

is the highest one of the RPI values $\{r_j\}|_{j=\{1,2,\ldots,N\}}$ of the "N" medical record providers $\{A_i\}|_{i=\{1,2,\ldots,N\}}$, and $$\min_{1 \leq j \leq N}(r_j)$$

is the lowest one of the RPI values $\{r_j\}|_{j=\{1,2,\ldots,N\}}$ of the "N" medical record providers $\{A_i\}|_{i=\{1,2,\ldots,N\}}$. In the present embodiment, $$\max_{1 \leq j \leq N}(r_j) = 20,$$

and $$\min_{1 \leq j \leq N}(r_j) = 1.$$

The adjusted RPI values $\{r_6', r_3', r_1', r_s'\}$ as shown in formula (6) are $\{16, 0, 5, 10\}$.

Further, the sum $R_s$ and the average value $R_m$ of the adjusted RPI values $\{r_6', r_3', r_1', r_8'\}$ may be calculated by the feedback computing unit 46 based on formula (7) and formula (8) below:

$$R_S = r_6' + r_3' + r_1' + r_8' = 31 \quad \text{formula (7)}$$

$$R_m = \frac{R_S}{4} = \frac{r_6' + r_3' + r_1' + r_8'}{4} = 7.75 \quad \text{formula (8)}$$

The sum $R_s$ of the RPI values $\{r_6', r_3', r_1', r_8'\}$ can be seen as the total feedback value being feedback to the medical record providers $\{A_6, A_3, A_1, A_8\}$ by the user 4. On the other hand, the average value $R_m$ of the RPI values $\{r_6', r_3', r_1', r_s'\}$ can be seen as the average feedback value being provided to the medical record providers $\{A_6, A_3, A_1, A_8\}$ by the user 4. Thus, a rating "C4" as disclosed in the U.S. patent application Ser. No. 13/939,764 can be the values described above in the present embodiment, such as the total feedback value $R_s$ or the average feedback value $R_m$.

In another embodiment of the present invention, if the user 4 publishes a publication works (for example, a research paper or a patent) which recites the medical records $\{MR_6, MR_3, MR_1, MR_8\}$ provided by the medical record providers $\{A_6, A_3, A_1, A_8\}$, it can be understood that the user 4 is providing feedback to the medical record providers $\{A_6, A_3, A_1, A_8\}$. The feedback computing unit 46 may also generate corresponding feedback values.

In addition, according to the compliance "C" and the feedback values (feedback values such as the sum $R_s$ or the average value $R_m$ of the adjusted RPI values), a rating "B" associated with the user identification UID may be calculated.

In one embodiment of the present invention, the rating "B" may be obtained through formula (9) below:

$$B = \alpha C \times (1-\alpha) R_m \quad \text{formula (9)}$$

In formula (9), $\alpha$ is a parameter that equals to 0, 1, or any decimals between 0 and 1 ($0 \leq \alpha \leq 1$). The "$\alpha$" may be used to adjust the weight values of the compliance "C" and the average value $R_m$ of the adjust RPI values, respectively. In one embodiment of the present invention, $\alpha$ has a predetermined value of 0.5, and the rating "B" equals to $4.9 \times 0.5 + 7.75 \times 0.5 = 6.325$. In another embodiment of the present invention, the value of a may be determined by the administrator of the computing device 1. In a further embodiment of the present invention, the value of $\alpha$ may be determined by the principal component analysis.

In another embodiment of the present invention, the rating "B" can be obtained by formula (10) below:

$$B = \alpha C \times (1-\alpha) R_s \quad \text{formula (10)}$$

In formula (10), the rating "B" may be obtained according to the compliance "C" and the sum $R_s$ of the adjusted RPI values. In the present embodiment, the rating "B" equals to $4.9 \times 0.5 + 31 \times 0.5 = 17.95$.

If the user 4 access the database 2 via the computing device 1 with the user identification UID for the first time, the rating "B" associated with the user identification UID is referred to as "B(1)". Similarly, if the user 4 accesses the database 2 via the computing device 1 with the user identification UID for the "$m^{th}$", time, the rating "B" associated with the user identification UID is referred to as "B(m)".

On the other hand, the final score computing unit 47 of the computing units 43 calculates a final score "T(m)" associated with the user identification UID based on the rating "B(m)" associated with the user identification UID. The final score is calculated based on formula (11) below:

$$T(m) = \beta \times B(m) + (1-\beta) \times P(m-1) \quad \text{formula (11)}$$

Herein, "P(m−1)" is the accumulated total utility value of the "(m−1)$^{th}$" usage record associated with the user identification UID in the past. The accumulated total utility value reflects the usage history of which the database 2 was accessed by the user via the computing device 1 with the user identification UID. If the user has a good usage history (for example, the user often access the database 2 via the computing device 1 with the user identification UID, or, the final score "T" associated with the user identification UID increments as the usage count increases), then the total utility value "P(m−1)" of the usage history becomes higher. In one embodiment of the present invention, the total utility value "P(m)" of the usage history in the previous number of "m" times can be defined by formula (12) shown below:

$$P(m) = b_1 \times INC(m) + b_2 \times DEN(m) \quad \text{formula (12)}$$

Herein, the factor INC(m) reflects the increment of the final score "T" of the user identification UID in the previous "m" times. For example, assuming that the final score "$\{T(1), T(2), \ldots, T(m)\}$" of the user identification UID in the previous "m" times increments with the usage count $\{1, 2, \ldots, m\}$ such that $T(1) < T(2) < \ldots < T(m-5) = T(m-4) < \ldots < T(m-1) < T(m)$, then INC(m) has a higher value. In the present embodiment, INC(m) may be obtained by formula (13) below:

$$INC(m) = \text{rankCor}(\{T(1), T(2), T(3), \ldots, T(m)\},\\ \{1, 2, 3, \ldots m\}) \quad \text{formula (13)}$$

In formula (13), rankCor(•) is the spearman rank correlation function, which reflects the increment of the final score $\{T(1), T(2), \ldots, T(m-1), T(m)\}$ in the previous "m" times as the usage count $\{1, 2, \ldots, m-1, m\}$ increases. Herein, the higher the degree of increment, the higher the value of rankCor(•) is.

On the other hand, in formula (12), the factor DEN(m) reflects the intensity of which the database 2 is accessed by the user via the computing device 1 with the user identification UID in the previous "m" times during a certain time period. In the present embodiment, the factor DEN(m) may be obtained by formula (14) below:

$$DEN(m) = \frac{m}{[Dat(m) - Dat(1)]/D} \quad \text{formula (14)}$$

Figure 4:
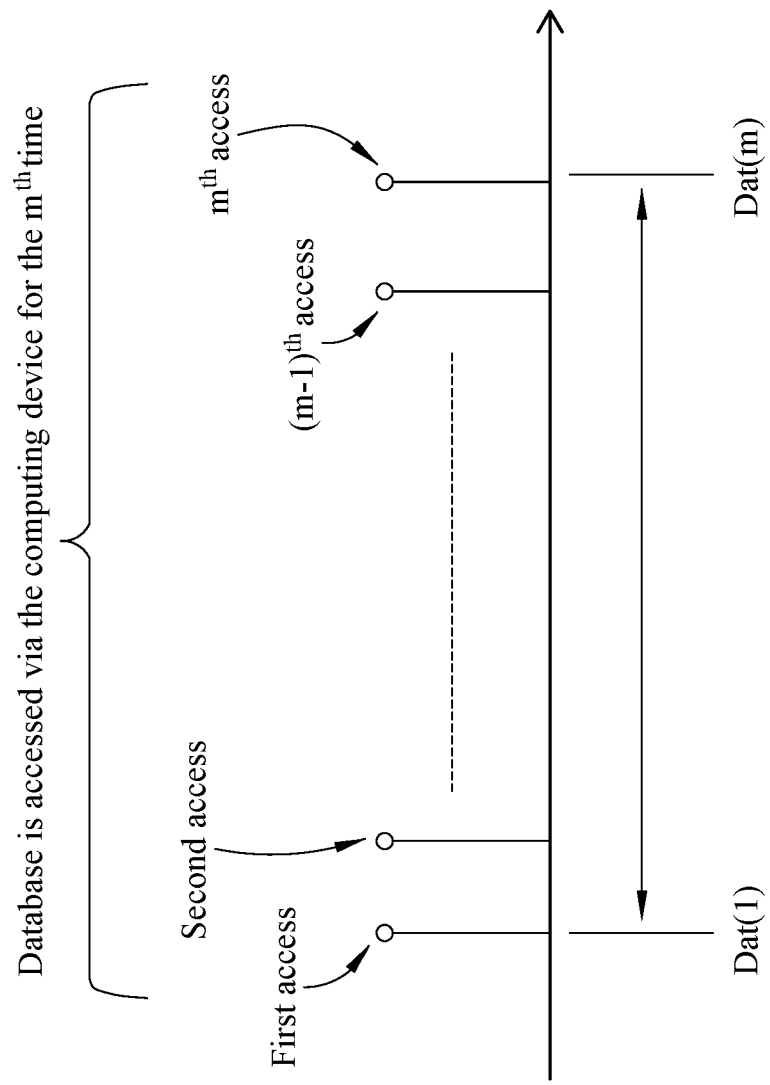
FIG. 4 is a schematic view using a timeline to illustrate the intensity of which a database is accessed by a user via the computing device according to an embodiment of the present invention.

FIG. 4 is a schematic view using a timeline to illustrate the intensity of which a database is accessed by the user via the computing device according to an embodiment of the present invention. FIG. 4 illustrates the intensity of which the database 2 is accessed by the user via the computing device 1 according to an embodiment of the present invention. As shown in FIG. 4, in formula (14), "Dat (m)" indicates the time at which the database 2 is accessed by the user via the computing device 1 with the user identification UID for the "$m^{th}$" time. "Dat (1)" indicates the time at which the database 2 is accessed by the user via the computing device 1 with the user identification UID for the first time. "[Dat (m)−Dat(1)]" indicates the time interval between which the database 2 is accessed by the user via the computing device 1 with the user identification UID for the "$m^{th}$" time and the database 2 is accessed by the user via the computing device 1 with the user identification UID for the first time. In addition, "D" indicates the time unit of "Dat (m)". Hence, "[Dat(m)−Dat(1)]/D" is a pure quantity and does not include a time unit. As shown in formula (14), during the time interval "[Dat(m)−Dat(1)]", the database 2 have been accessed by the user via the computing device 1 with the user identification UID for "m" times. Thus, the factor DEN(m) reflects the intensity of usage.

In the present embodiment, according to formula (12), the utility factor "$b_1$" of the predetermined factor INC(m) has the same value as the utility factor "$b_2$" of the factor DEN(m). The utility factor "$b_1$" and the utility factor "$b_2$" both equal to 0.5. In other embodiments of the present invention, the value of the utility factor "$b_1$" and "$b_2$" may be adjusted, so that the factor INC(m) and the factor DEN(m) may have different weight values.

On the other hand, in formula (11), β is a parameter which has a value of 0, 1, or a value of any decimal between 0 and 1 (0≤β≤1). β may be used to adjust the weight values of the rating "B(m)" and the total utility value "P(m−1)" of the usage history, respectively. In one embodiment of the present invention, β is a predetermined value and is 0.8. In another embodiment of the present invention, the value of β may be determined by the administrator of the computing device 1. In a further embodiment of the present invention, the value of β may be determined by the principal component analysis.

In the present embodiment, the total utility value "P(0)" of usage history of which the database 2 was accessed by the user for the first time with the user identification UID equals to zero. Thus, the final score "T(1)" equals to β×B(1). In the present embodiment, β is a predetermined value and is 0.8. Hence, the final score "T(1)" equals to 0.8×6.325=5.06.

Subsequently, after the database 2 is accessed by the user with the user identification UID for the second time, the rating "B(2)" associated with the user identification UID can be calculated according to formula (9) or formula (10), and the final score "T(2)" associated with the user identification UID equals to β×B(2)+(1−β)×P(1). Similarly, after the database 2 is accessed by the user with the user identification UID for the "$m^{th}$" time, the rating "B(m)" associated with the user identification UID can be calculated according to formula (9) or formula (10), and the final score "T(m)" associated with the user identification UID equals to β×B(m)+(1−β)×P(m−1). Further, the final score "T(m)" of the user identification UID is stored in the data source, such as the database 2.

When the database 2 is accessed by the user with the user identification UID for the $(m+1)^{th}$ time, the decision module 20 retrieves the final score "T(m)" associated with the user identification UID from the data source (e.g. the database 2 and/or the specimen bank and/or the RAM). The decision module 20 then determines a degree of convenience of which the database 2 can be accessed by the user via the computing device 1 for the $(m+1)^{th}$ time according to the retrieved final score "T(m)". If the final score "T(m)" is high, then the user would have a high degree of convenience to access the database 2. For example, if the final score "T(m)" is high, then the user may be able to pay a lower usage fee to the owner or the administrator (e.g. hospital) of the database 2.

In another embodiment of the present invention, the retrieved final score "T(m)" may determine a level of the user identification UID (for example, a data access level of which the user with the user identification UID has for the medical records $\{MR_i\}$ in the database 2). The higher the final score "T(m)", the higher the data access level being granted to the user with the user identification UID for the medical records $\{MR_i\}$ is. In other words, the user with the user identification UID may access medical records with a higher security level.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A computing device for data managing and decision making configured to communicate and exchange data with a data source to determine the value of at least one medical record, the computing device comprising:

a system ranking unit configured to rank at least one or more medical record providers to acquire a first ranking based on features of the at least one medical record stored in the data source, wherein the at least one or more medical record providers are in correspondence to the at least one medical record, wherein the system ranking unit determines the first ranking based on a number of times of which the at least one medical record provided by the at least one or more medical record providers is accessed or based on a degree of detail regarding to symptoms of patient of which the at least one medical record provided by the at least one or more medical record providers is recorded;

a subset ranking unit configured to select a subset from the at least one or more medical record providers having the first ranking based on the features of the at least one medical record, and configured to re-rank the medical record providers in the subset to acquire a second ranking, wherein the subset ranking unit selects the subset and determines the second ranking of the medical record providers in the subset based on a degree of contribution regarding to medical research of the at least one medical record provided by the at least one or more medical record providers;

a plurality of computing units configured to calculate a relevance of consistency between the first ranking acquired from all of the medical record providers and the second ranking acquired from part of the medical record providers, to calculate a second rating associated with a first identification message based on the relevance of consistency and a first rating associated with the at least one medical record, and to store the second rating in the data source, wherein the relevance of consistency refers to the ranking order of the at least one or more medical record providers between the first ranking and the second ranking; and a decision module configured to retrieve the second rating from the data source, to determine a data access level of the first identification message based on the second rating, and to access the at least one medical record based on the data access level of the first identification message;

wherein the first rating is determined based on a number of times of which the medical records are accessed by a user, or is determined based on the degree of details of which the medical records regarding the symptoms of the patient is recorded;

wherein a rating associated with the first identification message, which serves as a user identification (UID), is calculated based on the relevance of consistency and based on a total feedback value and/or an average feedback value calculated by a feedback computing unit; wherein the second rating associated with the first identification message, which serves as a final score, is calculated by a final score computing unit of the plurality of the computing units based on the rating associated with the first identification message;

wherein the rating refers to the product between the relevance of consistency, the total feedback value and/ or the average feedback value, the second rating refers to the product between the rating and the accumulated total utility value of the usage record associated with the first identification message in the past;

wherein the data access level is determined by the level of the second rating wherein the relevance of consistency between the first ranking and the second ranking of the medical record providers and the subset ranking is calculated by a compliance computing unit of the computing units, and determined by the formula $$C = 100 \times \frac{\sum_{i,j}^{n} W_{i,j} I(d_i, d_j)}{(n(n-1)/2)\sum_{i,j}^{n} W_{i,j}},$$

where C is the compliance between the rankings $\{d_i\}|_{i=1,2,\ldots,10}$ of the medical record providers, $I(d_i, d_j)$ is the indicator function, which is defined as $I(d_i, d_j)=1$ if $d_i<d_j$, $I(d_i, d_j)=0$ if $d_i>d_j$.

2. The computing device according to claim 1, wherein a weight computing unit of the plurality of computing units calculates a set of first weight values, which is in correspondence to the medical record providers having the first ranking, based on system rankings; wherein each first weight values of the set of first weight values is a fraction that is larger than zero, and the sum of the set of first weight values equals to one.

3. The computing device according to claim 2, wherein the set of first weight values is an arithmetic sequence, in which the first weight value that corresponds to a medical record provider having a first rank in the system rankings has a largest value, and the first weight value that corresponds to a medical record provider having a last rank in the system rankings has a smallest value.

4. The computing device according to claim 3,
wherein the weight computing unit of the plurality of computing units calculates a set of interchange weight values based on the set of first weight values and the medical record providers in the subset, and one interchange weight value of the set of interchange weight values is a product of the first weight values of two corresponding medical record providers in the medical record providers of the subset;
wherein the first weight values refer to the ranking of the medical record provider; and
wherein the interchange weight values are a product of the first weight values of the corresponding two medical record providers.

5. The computing device according to claim 4,
wherein the compliance computing unit of the computing units calculates a set of indicator function values based on the first ranking and the second ranking of the medical record providers in the subset, and the set of indicator function values corresponds to the two corresponding medical record providers in the medical record providers of the subset; and
wherein the indicator function value of the set of indicator function values refers to the consistency of a ranking result of the two corresponding medical record providers in the medical record providers of the subset in the first ranking and the second ranking.

6. The computing device according to claim 5, wherein if a ranking of the two corresponding medical record providers in the medical record providers of the subset in the second ranking is consistent with a ranking thereof in the first ranking, indicator function values of the corresponding two medical record providers are equal to one; otherwise, the indicator function values of the corresponding two medical record providers are equal to zero.

7. The computing device according to claim 6, wherein the relevance of consistency between the first ranking and the second raking is an adjustment value of a sum of products of the indicator function values of the corresponding two medical record providers and the interchange weight values, wherein the relevance of consistency is 0, 100 or a positive number between 0 and 100.

8. The computing device according to claim 7, wherein the first rating is a rating associated with the user identification, or is a feedback value, which is in correspondence to publication works, generated by the feedback computing unit of the plurality of computing units, or is a sum or an average value of adjusted feedback values associated with all of the medical record providers in the subset.

9. The computing device according to claim 8, wherein the second rating is a sum of a product of the first rating and a second weight value and a product of the relevance of consistency and a third weight value, wherein the second weight value is 0, 1 or a decimal between 0 and 1, and a sum of the second weight value and the third weight value equals 1.

10. The computing device according to claim 9, wherein the higher the second rating, the higher the data access level being granted to the first identification message for the at least one medical record is.

* * * * *